US012447532B2

(12) United States Patent
Ye (10) Patent No.: US 12,447,532 B2
(45) Date of Patent: Oct. 21, 2025

(54) SYSTEMS AND METHODS FOR LASER ADDITIVE MANUFACTURING FOR STRUCTURED BATTERY ELECTRODES

(71) Applicant: Lawrence Livermore National Security, LLC, Livermore, CA (US)

(72) Inventor: Jianchao Ye, Tracy, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 5 days.

(21) Appl. No.: 17/714,599

(22) Filed: Apr. 6, 2022

(65) Prior Publication Data

US 2023/0321725 A1  Oct. 12, 2023

(51) Int. Cl.
| | | |
|---|---|---|
| *B22F 12/41* | (2021.01) | |
| *B22F 1/105* | (2022.01) | |
| *B22F 10/16* | (2021.01) | |
| *B22F 12/49* | (2021.01) | |
| *B22F 12/53* | (2021.01) | |

(Continued)

(52) U.S. Cl.
CPC .............. *B22F 10/16* (2021.01); *B22F 1/105* (2022.01); *B22F 12/41* (2021.01); *B22F 12/49* (2021.01); *B22F 12/53* (2021.01); *B22F 12/58* (2021.01); *B33Y 10/00* (2014.12); *B33Y 30/00* (2014.12); *B33Y 40/10* (2020.01); *B33Y 70/10* (2020.01);

(Continued)

(58) Field of Classification Search
CPC .......... B22F 10/16; B22F 1/105; B22F 12/41; B22F 12/49; B22F 12/53; B22F 12/58; B22F 2301/052; B22F 2302/40; B33Y 10/00; B33Y 30/00; B33Y 40/10; B33Y 70/10; B33Y 80/00
See application file for complete search history.

(56) References Cited

U.S. PATENT DOCUMENTS

2017/0341145 A1* 11/2017 Foster ..................... B22F 10/38
2018/0114979 A1   4/2018 Yoon et al.

(Continued)

FOREIGN PATENT DOCUMENTS

| CN | 102013332 A | 4/2011 |
| CN | 107710455 A | 2/2018 |

(Continued)

OTHER PUBLICATIONS

Gibson, I., Rosen, D., Stucker, B., Khorasani, M. (2021), Additive Manufacturing Technologies, Springer, Cham., available online Nov. 11, 2020, https://doi.org/10.1007/978-3-030-56127-7_5 (Year: 2020).*

(Continued)

*Primary Examiner* — Rebecca Janssen
(74) *Attorney, Agent, or Firm* — HARNESS, DICKEY & PIERCE, P.L.C.

(57) ABSTRACT

The present disclosure relates to a system for making an electrically conductive battery component. The system uses a metal layer forming a planar metal substrate, and a powder deposition component for applying a powder to form a powder layer on the planar metal substrate. A laser is used and configured to generate a laser beam to selectively sinter portions, or all, of the powder layer using a predetermined beam scanning pattern. A subsystem is used to remove portions of the powder layer that are not sintered by the laser to leave a planar finished material layer.

11 Claims, 7 Drawing Sheets

(51) Int. Cl.
  *B22F 12/58*     (2021.01)
  *B33Y 10/00*     (2015.01)
  *B33Y 30/00*     (2015.01)
  *B33Y 40/10*     (2020.01)
  *B33Y 70/10*     (2020.01)
  *B33Y 80/00*     (2015.01)

(52) U.S. Cl.
  CPC ......... *B33Y 80/00* (2014.12); *B22F 2301/052* (2013.01); *B22F 2302/40* (2013.01)

(56) References Cited

U.S. PATENT DOCUMENTS

| | | | |
|---|---|---|---|
| 2018/0151864 | A1 | 5/2018 | Huang et al. |
| 2021/0249657 | A1 | 8/2021 | Shin et al. |
| 2021/0280842 | A1 | 9/2021 | Shin et al. |

FOREIGN PATENT DOCUMENTS

| | | |
|---|---|---|
| CN | 110655114 A | 1/2020 |
| KR | 20220094949 A | 7/2022 |

OTHER PUBLICATIONS

Continuous 3D Printing: what are the solutions on the market?, 3Dnatives, published Jan. 14, 2021, at https://www.3dnatives.com/en/continuous-3d-printing-140120204/, last accessed Feb. 17, 2023 (Year: 2021).*

Ludwig et al., Powder-Based Additive Manufacturing of Li—Ion Batteries and Micropowder Mixing Characteristics, Proceedings of the ASME 2017 12th International Manufacturing Science and Engineering Conference, published online Jul. 24, 2017 (Year: 2017).*

I. Gibson et al., Additive Manufacturing Technologies, https://doi.org/10.1007/978-3-030-56127-7_8 section 8.1 (Year: 2020).*

Cole, section V, history of system claims, NTP v. RIM: The Diverging Law Between System and Method Claim Infringement, Pierce Law Review, vol. 5, No. 2 pp. 347-365, 2007 (Year: 2007).*

Ahmed, S., Nelson, P. A., Gallagher, K. G. & Dees, D. W. Energy impact of cathode drying and solvent recovery during lithium-ion battery manufacturing. *Journal of Power Sources* 322, 169-178, (2016).

Ye, J. et al. Energy coupling mechanisms and scaling behavior associated with laser powder bed fusion additive manufacturing. *Advanced Engineering Materials* 21, 1900185, (2019).

In, J. B et al. Facile fabrication of flexible all solid-state micro-supercapacitor by direct laser writing of porous carbon in polyimide. *Carbon* 83, 144-151, (2015).

Ye, J. et al. Ultra-Low-Density Digitally Architected Carbon with a Strutted Tube-in-Tube Structure. *Nature Materials Accepted*.

Acord, K. A. et al. Morphology, microstructure, and phase states in selective laser sintered lithium ion battery cathodes. *Journal of Materials Processing Technology* 288, 116827, (2021).

Maurel, A. et al. Considering lithium-ion battery 3D-printing via thermoplastic material extrusion and polymer powder bed fusion. *Additive Manufacturing* 37, 101651, (2021).

International Search Report and Written Opinion for International application No. PCT/US2023/017599 mailed Aug. 7, 2023, 10 pages.

International Search Report and Written Opinion for corresponding PCT International Application No. PCT/US2024/030947 mailed Sep. 23, 2024, 12 pages.

* cited by examiner

SYSTEMS AND METHODS FOR LASER ADDITIVE MANUFACTURING FOR STRUCTURED BATTERY ELECTRODES

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for manufacturing batteries and components thereof, and more particularly to systems and methods which use additive manufacturing techniques to manufacture electrical current carrying components, and in some embodiments electrodes for batteries.

BACKGROUND

The statements in this section merely provide background information related to the present disclosure and may not constitute prior art.

Accelerated adoption of lithium batteries for electric vehicles (EVs) and grid storage requires lowering battery manufacturing costs while retaining high power and energy densities. Although tape casting-based, roll-to-roll manufacturing has enabled lithium-ion batteries (LIBs) to reach a cell-level cost of $107/kWhrated (2021 BatPaC, ANL) at the present time. And there is strong interest in still further cost reduction and performance improvements for LIBs. According to BatPaC cost analysis, the cell manufacturing represents 17.1% of total cost of manufacturing a LIB, from which electrode processing contributes the most.

LIB manufacturing has traditionally been expensive for a number of reasons. One is the use of solvents during processing (e.g., N-Methylpyrrolidone ("NMP"), $H_2O$, etc.). The use of solvents necessitates long drying times and drives high energy consumption. Moreover, many solvents such as NMP are toxic to humans and present hazards for the environment, requiring expensive recovering and safety protocols. Therefore, the elimination of the use of solvent in LIB manufacturing processes has particularly strong interest.

Besides the cost reduction, battery performance improvement, especially in LIBs with higher energy and power densities, is also presently being sought to accelerate the electrification revolution. Simply thickening a battery electrode in the tape-casting method increases energy density but lowers power density. To retrieve the power density, fast ionic and electronic transport channels are critical in the designs of the structured electrodes. Various technologies have been proposed to generate the structured electrodes, such as casting head designs, laser hole-drilling, 3D scaffolds with loaded active materials, and 3D printing. However, the use of a solvent, the low integration ability and high processing cost of present day manufacturing technologies, are all challenges that still need to be addressed.

SUMMARY

This section provides a general summary of the disclosure, and is not a comprehensive disclosure of its full scope or all of its features.

In one aspect the present disclosure relates to a system for making an electrically conductive battery component. The system uses a metal layer forming a planar metal substrate, and a powder deposition component for applying a powder to form a powder layer on the planar metal substrate. A laser is used and configured to generate a laser beam to selectively sinter portions, or all, of the powder layer using a predetermined beam scanning pattern. A subsystem is used to remove portions of the powder layer that are not sintered by the laser to leave a planar finished material layer.

In another aspect the present disclosure relates to a system for making an electrically conductive battery component. The system includes a planar metal layer forming a planar metal substrate, an electrostatic spray gun, a laser and a vacuum subsystem. The electrostatic spray gun applies a dry powder mixture which forms a dry powder layer on the planar metal substrate. The laser is configured to generate a laser beam to selectively sinter portions, or all, of the dry powder layer using a predetermined beam scanning pattern, a predetermined laser power and a predetermined scanning speed. The vacuum subsystem removes portions of the powder layer that are not sintered by the laser to leave a planar finished material layer. The planar finished material layer is comprised of tracks of sintered powder separated by linear, powder free sections.

In still another aspect the present disclosure relates to a method for making an electrically conductive battery component. The method comprises arranging a metal layer to form a planar metal substrate, and depositing a powder layer on the planar metal substrate. The method further includes using a laser to generate a laser beam to selectively sinter portions, or all, of the powder layer using a predetermined beam scanning pattern. The method further includes removing portions of the powder layer that are not sintered by the laser to leave a planar finished material layer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is directed to a laser powder-bed fusion (L-PBF) approach for the manufacturing of electrodes. In a typical L-PBF process, a powder layer is spread onto a substrate, followed with laser scans with defined patterns to selectively densify the powders via melting and re-solidification. L-PBF has been widely explored for the additive manufacturing of complex metal parts. L-PBF manufacturing techniques have recently demonstrated the ability to create 3D parts having unique microstructures and improved mechanical properties.

The present disclosure provides for systems and methods for manufacturing the electrodes of lithium ion batteries ("LIBs"). A polymer binder is selectively melted by laser heating and bonds active material and carbon black together onto a current collector. This enables forming structured designs which facilitate Li+ transport through thick electrodes. The solvent-free L-PBF process of the present disclosure provides excellent scalability along with a high production rate. The process of the present disclosure significantly reduces manufacturing cost, energy consumption, and the environmental impact of manufacturing high-performing batteries.

Figure 1:
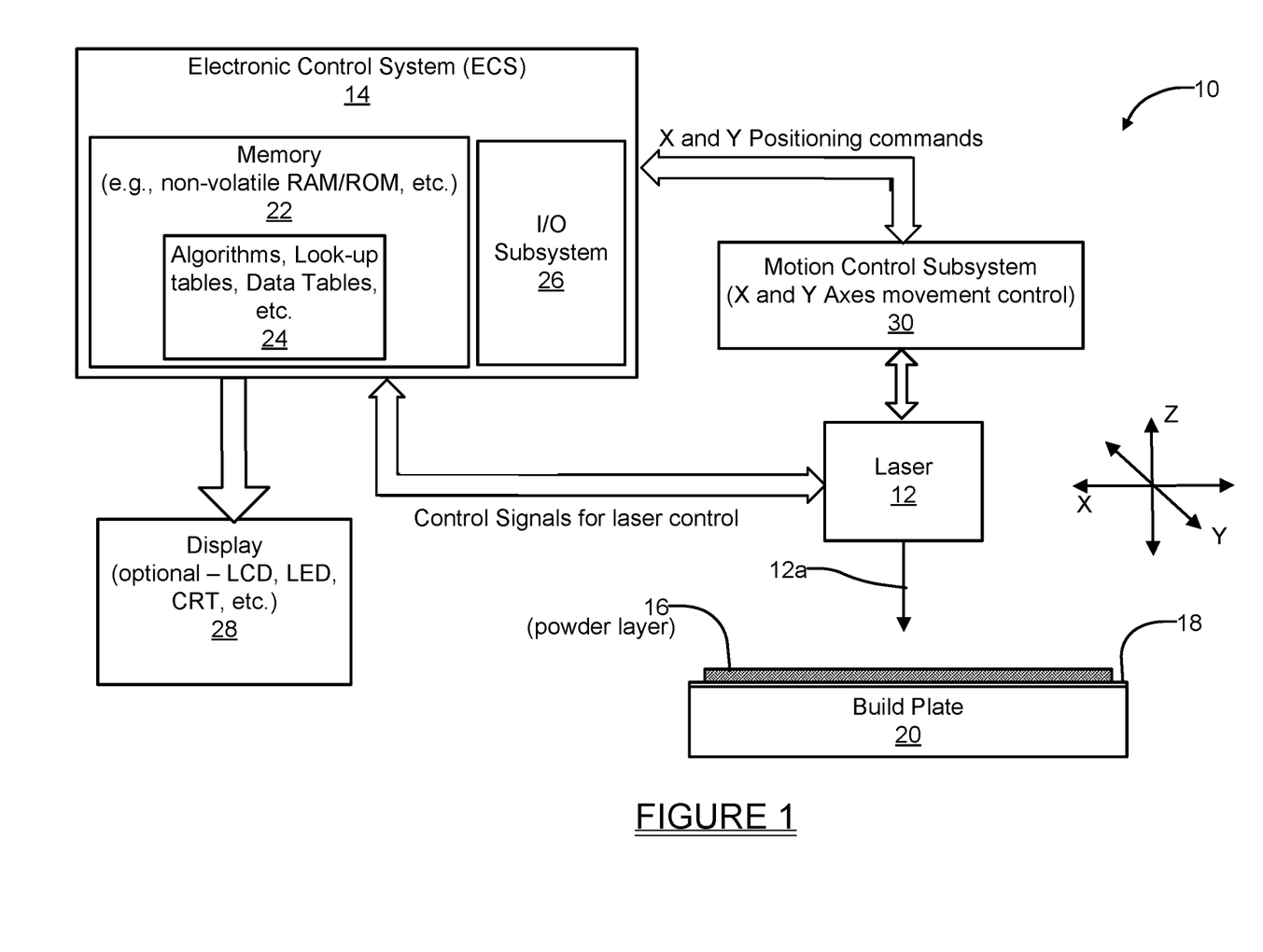
FIG. 1 is a high level view of one embodiment of a system for performing a laser powder bed fusion (L-PBF) operation in creating an electrically conductive component that can be used to form a battery component.

Referring to FIG. 1, a system 10 is shown for carrying out the L-PBF process and creating structured components that are well suited for creating current carrying elements of a battery, and particularly LIBs. A laser 12 is controlled by an electronic control system (ECS) 14 to fuse select portions of a powder layer 16 which is present on a planar layer of metal material 18 which forms a metallic layer substrate, which in turn is resting on a build plate 20. The layer of metal material is typically a layer of aluminum foil, although other metal materials such as nickel or copper, for example, could be used as well. The powder layer used may vary to meet the needs of a specific application, but in one embodiment dry powder NMC 811, carbon black and polyvinylidene fluoride (PVDF) binder are mixed with a desired compositional ratio (e.g., 9:0.5:0.5), and deposited, in one embodiment by spraying, onto the metal material layer 18. The metal material 18 layer in one embodiment may be Aluminum (Al). It will also be understood that the compositional ratio given above may be modified as needed to optimize the mixture for a specific application.

The ECS 14 may include a number of subsystems either integrated within it or separate but in communication with it, for control the laser 14 and overall operation of the manufacturing process. In the embodiment shown in FIG. 1 the ECS 14 includes a non-volatile memory 22, which may include one or more of a RAM, ROM, etc., along stored information pertaining to one or more of algorithms, look-up tables, data tables 24 for carrying out the L-PBF manufacturing process according to the present disclosure. An input/output (I/O) subsystem 26 may also be included in the ECS 14 for communicating with other components of the system 10, for example an external (optional) display subsystem (e.g., LCD, LED, CRT, desktop computer, laptop computer, smartphone, computing tablet, etc.) The I/O subsystem 26 may include suitable components for interfacing to one or more external subsystems, such as a serial interface (e.g., RS-232, RS-422, etc.), a parallel interface, a short range wireless communications protocol such as a BLUETOOTH® wireless communications protocol interface, a USB interface, an Ethernet communications interface, just to name a few possible types of interfaces. The I/O subsystem 26 may also be used to assist the ECS 14 in providing positioning commands to a motion control subsystem 30 which is being used to move the laser 14 along X and Y axes while carrying out the L-PBF operation. The motion control subsystem 30 may include suitable driving components for highly accurate X and Y axis positioning (e.g., stepper motors, linear actuators, etc.). The laser generates a beam 14a of a predetermined beam diameter which is used to melt select areas of the powder layer 16.

Figures 2, 2A:
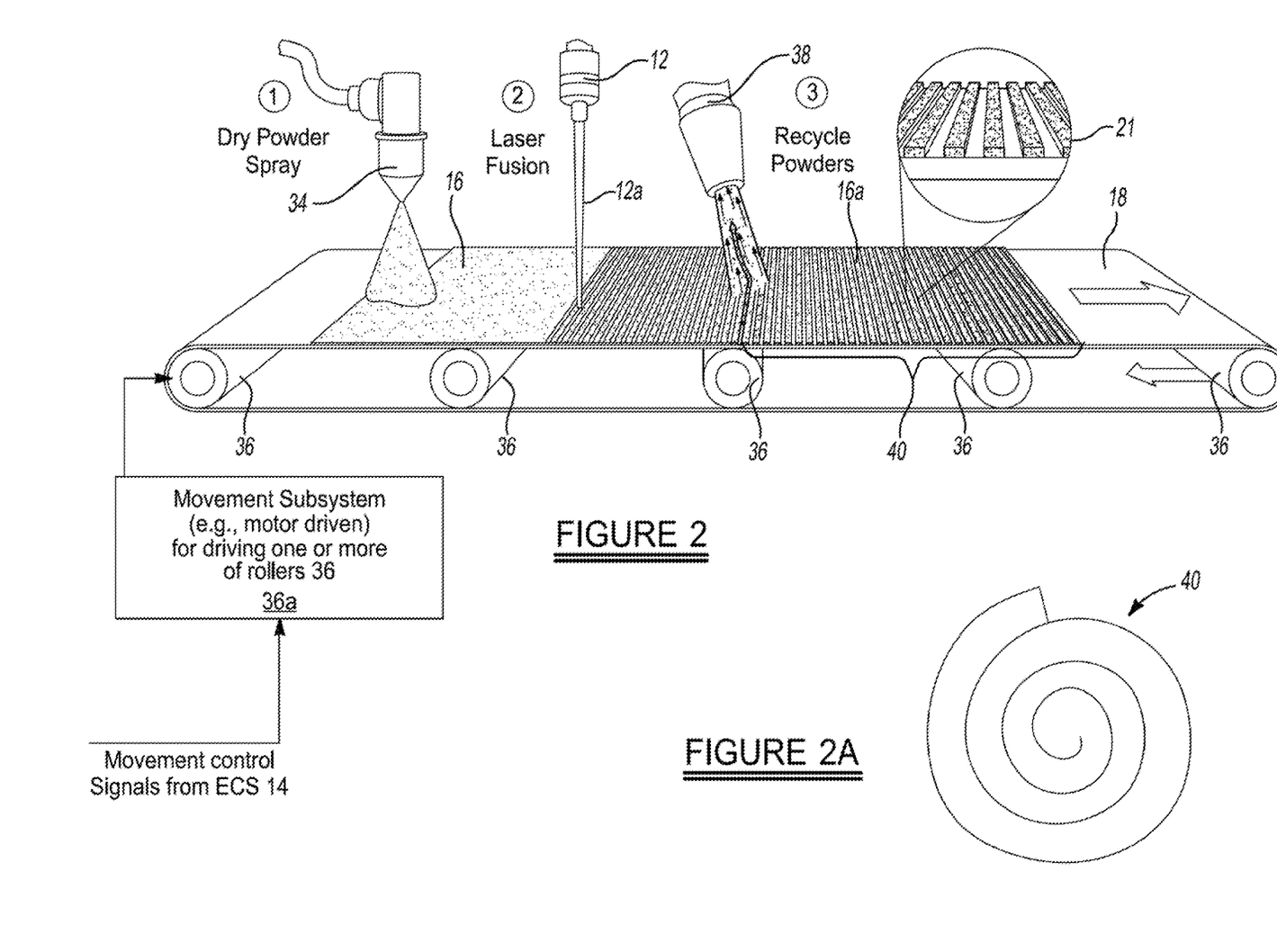
FIG. 2 is a high level diagram of operations that may be performed in forming a battery component such as an anode or cathode.
FIG. 2a shows a plan view of one example of the finished material created from the process of FIG. 2 after being rolled into a cylindrical shape to form an anode or cathode.

FIG. 2 shows a high level diagram illustrating various operations being performed, some of which involve using one or more components of the system 10 shown in FIG. 1. In FIG. 2 the dry powder which forms the powder layer 16 is deposited on a layer of metal material layer 18. One embodiment of the present disclosure involves using a dry powder sprayer 34 to apply the powder layer in a desired thickness, which in most applications will be a layer having a uniform thickness (e.g., typically between 0.02 mm and 0.1 mm), but which may vary considerably to meet the needs of a specific application. The dry powder in this example is sprayed onto the metal material layer 18 (e.g., layer of Al foil) using an electrostatic powder spray coating technique. In this process, the powder(s) is/are brought out from a reservoir (not shown) by an externally produced air flow, and pass by the spray gun nozzle, where a high voltage electrode (not shown) charges the particles as they flow past the high voltage electrode. The charged powder particles are attracted by the grounded metal layer 18 substrate and coated onto it. The loose powder film thickness can be adjusted by nozzle-substrate distance, carrier gas pressure and coating time, so that the thickness may range from tens of micrometers up to hundreds of micrometers in thickness. The powder(s) is/are loosely packed and can be blown off.

In manufacturing a cathode, as one example, dry powders of Nickel Manganese Cobalt (e.g., NMC 811) may be preferred. However, other materials such as, without limitation, NMC 622, NMC532, NMC111, NCA, LCO, LFP, etc., may be used as well. One or more of these just-mentioned powders may be mixed with carbon black (graphite, etc.), and Polyvinylidene fluoride (PVDF) for example PAA, CMC, PTFE, and other common battery binders, which acts as a binder. The powder(s) used are mixed with predetermined compositional ratios determined for a specific application. In manufacturing an anode, dry powders of graphite may be preferred. However, other materials such as silicon, metal oxides may be used as well. PVDF or other common battery binders may be mixed with the above anode materials to form the spray powder mixtures.

The laser 12 emits the laser beam 12a which melts select portions of the dry powder layer 16 in accordance with the pattern of movement of the laser 12. The laser 12 may be a continuous wave $CO_2$ laser, or possibly a continuous wave glass fiber laser. Taking the cathode as an example, dry powders of NMC 811 (can be other cathode materials such as NMC 622, NMC532, NMC111, NCA, Lithium Cobalt Oxide (LCO), Lithium Iron Phosphate (LFP), etc.)), can be mixed with carbon black (graphite, etc.), and PVDF or Pericetic Acid (PAA), Carboxymethyl cellulose (CMC), Polytetrafluorethylene (PTFE), and/or other common battery binders with certain compositional ratios.

The beam spot size of the laser beam 12a may vary significantly to suit specific applications, but it is expected that most applications will require a beam spot diameter of between about 50 µm to possibly 1 cm, or even larger. The laser power used will also vary significantly according to the specific application. In some embodiments a laser power of between 1 W and 1 kW will likely be preferred in operating the laser. Furthermore, it is expected that a volumetric laser energy density ranging between about 0.1 $Wh/cm^3$ to about 2 $Wh/cm^3$ will also be preferred for most applications. The speed used in scanning the laser 12 may vary significantly, but it is expected that in most applications a scan speed of between about 1 mm/second and 3000 mm/second will be preferred.

Optionally, as shown in FIG. 2, the metal layer 18 may be formed as an endless sheet-like loop of thin metal material (e.g., Al foil) over one or more rollers 36, and the metal layer moved incrementally laterally as the one or more rollers 36 are driven by a movement subsystem 36a (including, e.g., one or more DC stepper motors), as the laser 12 sinters the powder layer 16 in a raster scan-like pattern. This embodiment thus requires movement of the laser 12 back and forth along only one axis, as a highly controlled, incremental lateral movement on the order typically about 50 µm to about 100 mm of the metal material layer 18 is performed after each linear pass of the laser beam 12a using the one or more rollers 36.

A suitable tool or vacuum-like device or subsystem 38 is then used remove any un-melted powder, leaving, in this example, line-like traces 16a of solidified metal formed on the metal layer 18 which have an engineered thickness, height and spacing from adjacent solidified metal traces. Portion 40 thus represents a finished material layer. The solidified metal traces 16a are shown in highly enlarged fashion in section 2.1 of FIG. 2. The metal layer 18 may then be removed from the rollers 36, cut or sectioned as needed, and rolled together with a separator layer and a counter electrode layer to form a cylindrical cell, such as shown in FIG. 2a. Optionally, the metal layer 18 may be cut into several sections and stacked together with a separator layer and a counter electrode layer to form a multi-layer pouch cell. It is important to note that the above-described process does not involve the use of any solvents, nor does it require any drying operations, which both contribute to overall cost and/or environmental issues, and which can significantly increase the time needed to manufacture a battery component.

Figure 3:
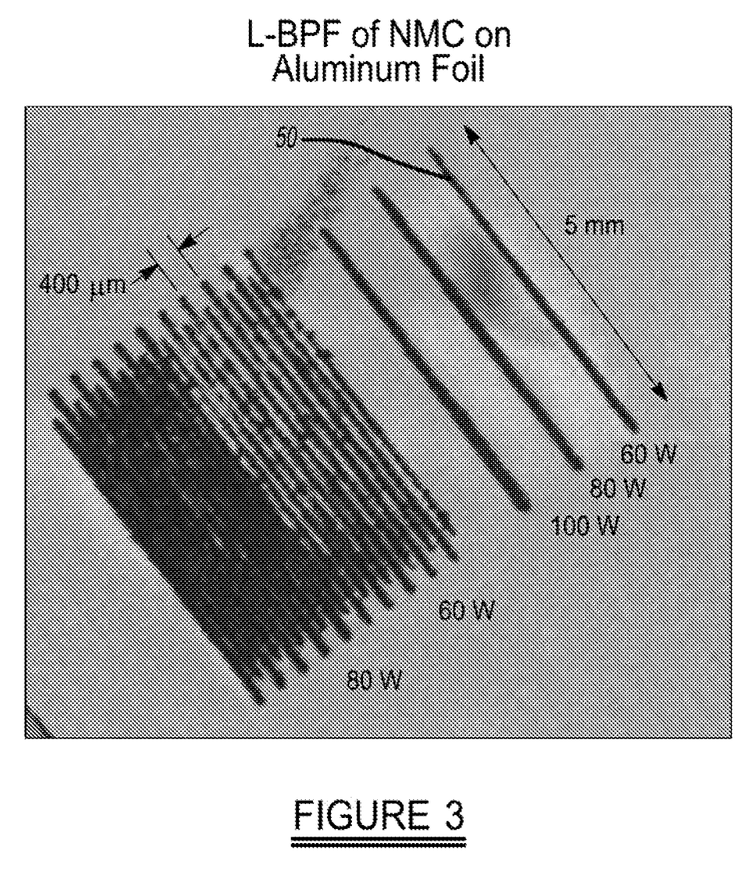
FIG. 3 is an image obtained using a scanning electron microscope (SEM) image showing multiple tracks of NMC/PAA using a 35 um gaussian beam profile generated by a Nd:YAG laser with a 500 mm/s scan speed, and using different laser power levels, to illustrate the resolution that is possible in creating line-like tracks using different laser power levels.

Referring to FIG. 3, an image obtained using a scanning electron microscope (SEM) image shows multiple tracks 50 of fused NMC/PAA using a 35 um gaussian beam profile generated by the laser 12, which in instance was an Ytterbium fiber laser with a 500 mm/second scan speed. The tracks 50 were created using different laser power levels ranging from 60 W to 100 W. The tracks 50 illustrate the resolution that was achieved in creating line-like tracks using different laser power levels. Track 50 separation of only 200 µm or even less is possible.

Figure 4:
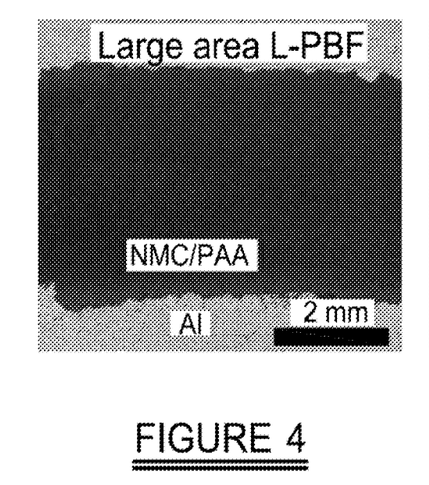
FIG. 4 is a top (i.e., plan view) SEM image of an L-PBF sintered NMC/PAA powder layer on Al foil using a 3.5 mm flat top $CO_2$ laser with 5 W power.
Figure 5:
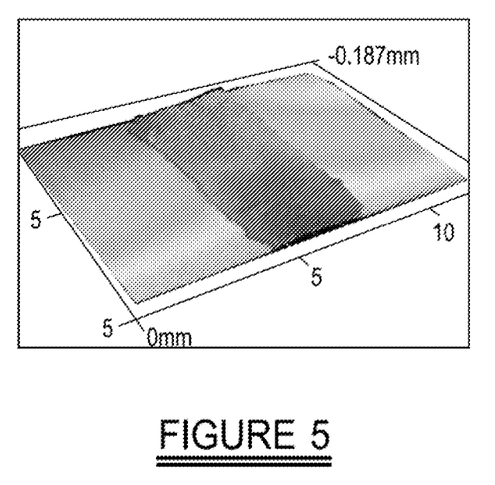
FIG. 5 is the height profile of the laser sintered NMC/PAA ribbon shown in FIG. 4, measured using a 3D digital microscope.
Figure 6:
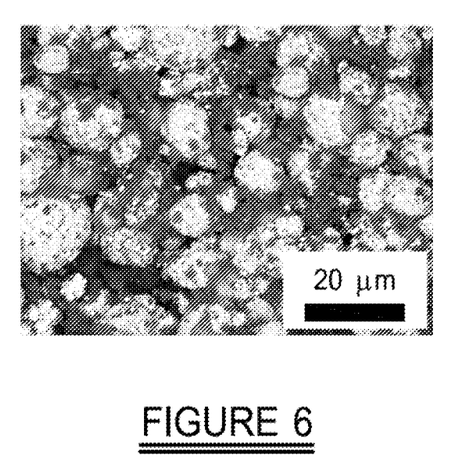
FIG. 6 is a SEM image of the L-PBF processed NMC/PAA powder layer on Al foil using a 3.5 mm flat top $CO_2$ laser with 5 W power and 4 mm/sec scan speed.

FIG. 4 is a top (i.e., plan view) SEM image of an L-PBF sintered NMC/PAA powder layer on Al foil using a 3.5 mm flat top $CO_2$ laser with 5 W power. FIG. 5 is a height profile for the surface shown in FIG. 4, measured using a 3D digital microscope. FIG. 6 is a SEM image of the L-PBF processed NMC/PAA 2 powder layer on Al foil using a 3.5 mm flat top $CO_2$ laser with 5 W power and 4 mm/second scan speed. The NMC particles are bonded together by PAA binder particles, with some regions that are directly exposed.

Figure 7A:
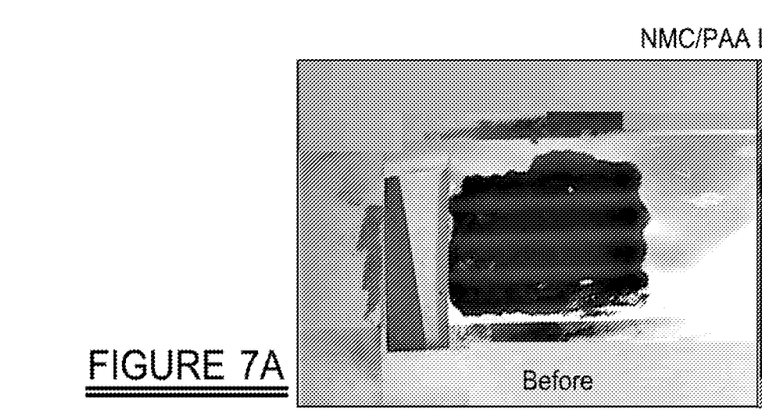
FIGS. 7a and 7b are images of an L-BPF fabricated NMC/PAA layer on Al foil before (FIG. 7a) and after (FIG. 7b) a peel test, showing only a small portion of the powder layer is detached from the substrate and suggesting excellent adhesion.
Figure 7B:
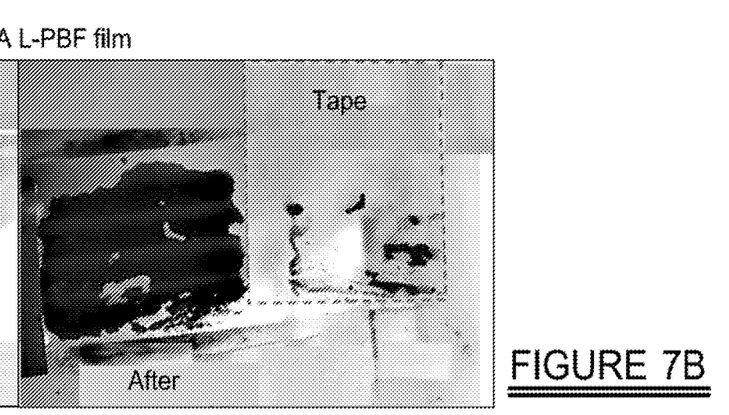

FIGS. 7a and 7b are images of an L-BPF fabricated NMC/PAA layer on Al foil before a peel test (FIG. 7a) and after the peel test (FIG. 7b), showing only a small portion of areas were peeled off by using SCOTCH® brand adhesive tape. These images suggest excellent adhesion between NMC particles as well as between NMC particles and Al foil using the manufacturing technique of the present disclosure.

Figure 7C:
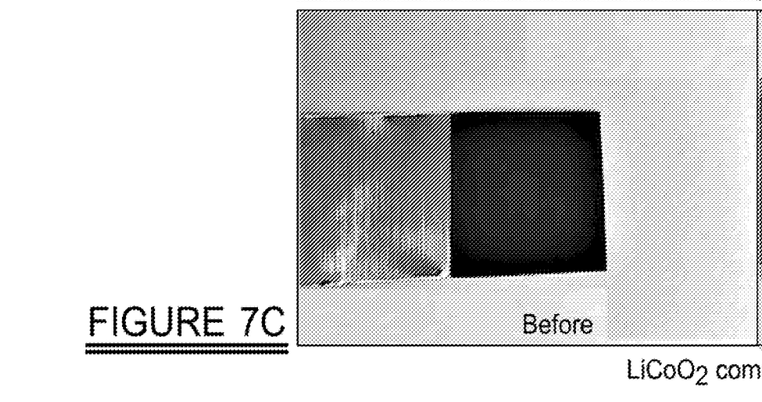
FIGS. 7c and 7d are images of a $LiCoO_2$ commercial cathode film before derived from tape casting before (FIG. 7c) and after (FIG. 7d) a peel test, showing much worse adhesion.
Figure 7D:
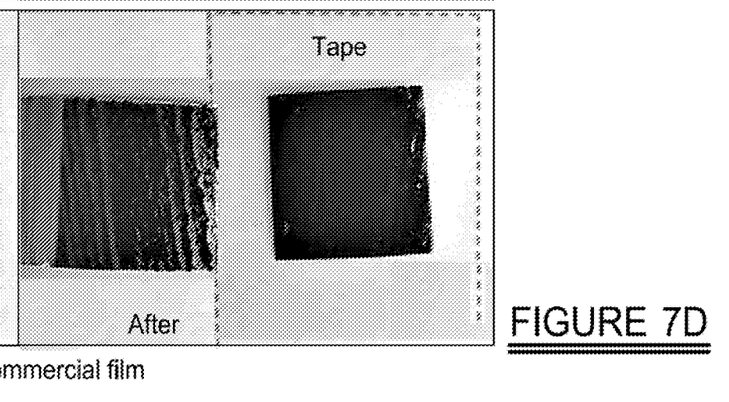

FIGS. 7c and 7d are images of a $LiCoO_2$ (LCO) commercial cathode film before derived from tape casting before a peel test (FIG. 7c) using the same type of adhesive tape, and after the peel test (FIG. 7d). These images illustrate that significantly less adhesion of the NMC/PAA layer for the LCO cathode film is achieved from tape casting.

Figure 8:
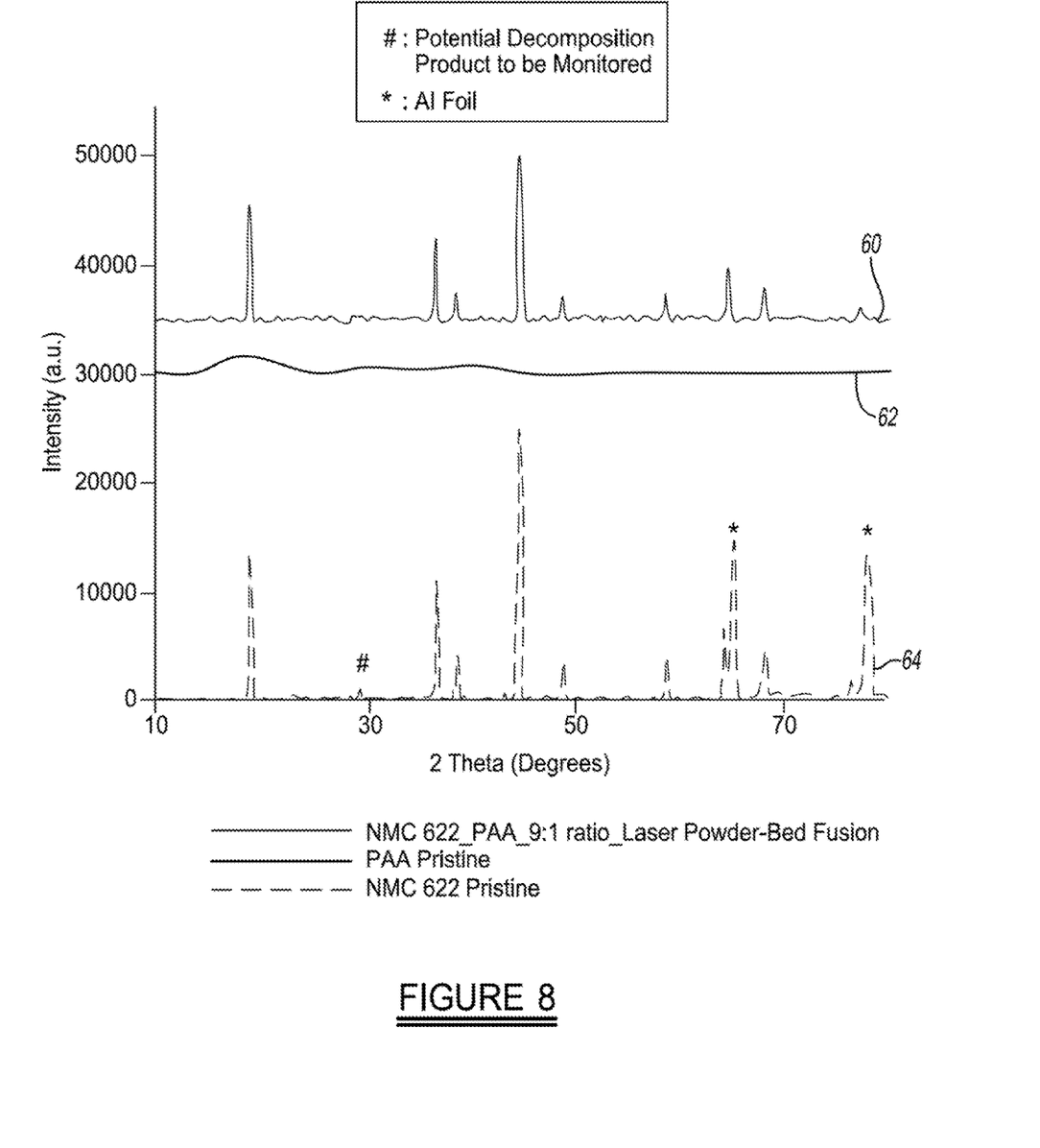
FIG. 8 shows X-ray diffraction pattern of a L-PBF processed NMC/PAA layer in comparison with pristine PAA and NMC 622 powders, with the results suggesting that the NMC 622 crystalline structure was preserved after laser processing.

FIG. 8 shows XRD patterns of NMC 622 PAA (9:1 ratio) fused using the L-BPF approach described herein, represented by plot 64; PAA Pristine represented by plot 62 and NMC 622 Pristine represented by plot 60. The crystalline structure of the NMC 622 is well preserved, which is critical in the demonstration of Li storage capability.

Figure 9:
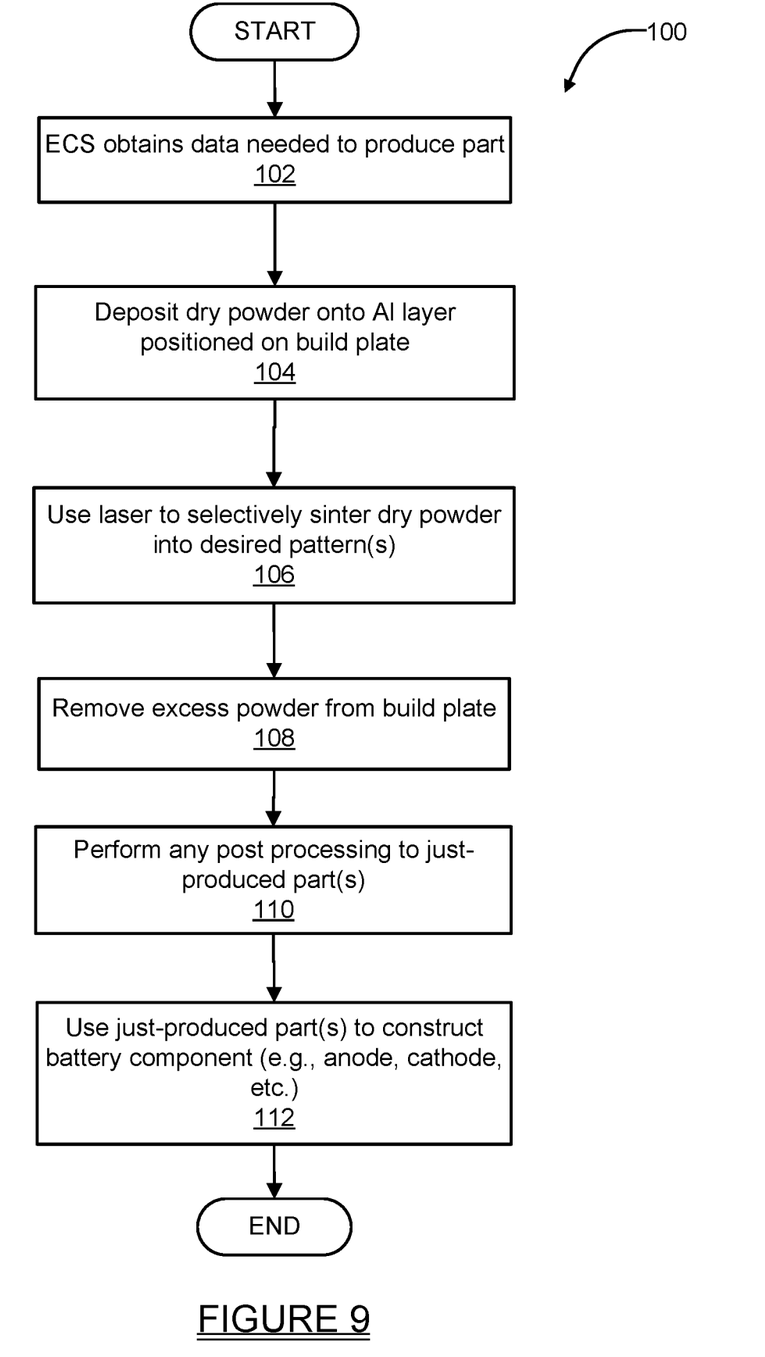
FIG. 9 is a high level flowchart showing various illustration in performing an L-PBF method on a powder (e.g., NMC/PAA 2) in forming a layer of material well suited for forming an electrically conductive battery component.

FIG. 9 is a high level flowchart 100 showing various illustration in performing an L-PBF method on a powder (e.g., NMC/PAA 2 or other powder mixture) in forming a layer of material well suited for forming an electrically conductive battery component. At operation 102 the ECS 14 may initially obtain the data needed to produce the part (e.g., cathode, anode, etc.). At operation 104 the dry powder is deposited, in one embodiment via a spray gun, onto a metal layer, for example an Al layer positioned on the build plate 20. The laser 12 is then used to selectively melt sections of the dry powder, in one example by using a line-by-line raster scanning pattern, which then re-solidify into one or more desired patterns, as indicated at operation 106. At operation 108 excess powder is removed from the build plate 20. Any further post processing operations may then be performed on the part being manufactured, as indicated at operation 110. At operation 112 the just-produced part(s) may be used to produce a battery component, for example an anode, a cathode, or all or a portion of a battery cell.

The system and method in its various embodiments described herein provides a number of advantages over previous electrode manufacturing processes. For one, no solvent is involved in the powder coating and structuring, making it environmentally benign. The methods disclosed herein also provide a low energy cost when comparted to previously used manufacturing techniques. Another advantage is that the electrostatic powder spray coating is readily scalable to dimensions of over square meters per minute. Still further, any unmelted powder can be reused, thus reducing waste and cost. The focused laser 12 can generate high-resolution patterns (e.g., <20 mm) with extremely fast speed (e.g., 3000 mm/s or even potentially higher) for high power-density designs. The cathode materials are firmly attached to the Al foil by laser-induced melting using the L-PBF process described herein. Partial carbonization at intermediate temperatures can also improve the electronic conductivity of the binder. The recoiling pressure under the laser beam 12*a* can introduce compressive force to further densify the porous layer in the thickness direction (i.e., Z direction), which may eliminate the need of calendaring. The extremely rapid cooling rate preserves the amorphous state of the binders, improving Li+ transport. Multilayer printing also allows for gradient chemical and morphological designs to be introduced into the part being manufactured.

The invention of the present disclosure thus provides a new electrode manufacturing technology that can significantly improve both energy and power densities while avoiding the use of a solvent to reduce energy consumption, production time, and environmental impact. The manufacturing approaches described herein are expected to have has a long-term impact on the future of battery technologies. While NMC cathodes have been described herein as being manufactured, the present disclosure is not limited to producing only cathodes. The teachings presented herein may be used for anode fabrication, which may solve the lithium plating issues and therefore further improve the rate and cycling performance of LIB's. Similarly, the teachings presented herein may be used to develop structured solid-state batteries by changing the cathode recipe with solid state electrolyte/cathode mixtures or by infilling the structured cathode with UV/thermally composite polymer electrolytes. These options further demonstrate the wide range of applicability of the new manufacturing techniques for battery technology described in the present disclosure.

Finally, it will be noted that the manufacturing techniques described in the present disclosure can be used for the manufacture of not only LIBs, but also, without limitation, solid state lithium batteries, solid state ion batteries, and solid state sodium batteries, with reduced cost and improved performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for making an electrically conductive battery component using a conveyor system having a plurality of spaced apart rollers, the system comprising:
   a continuous, flexible, planar, grounded metal layer forming a build plane and further being configured to be entrained around the plurality of spaced apart rollers of the conveyor system, and further forming a planar metal substrate for supporting powder of a first material directly thereon and adapted to be cut, removed from the plurality of spaced apart rollers, such that the continuous, flexible, planar metal layer is able to be used as a support structure during a sintering operation, and also as a component which forms a structural portion of the electrically conductive battery component;

an electrostatic powder deposition component for applying a powder of a second material different from the first material, and which includes an active material, carbon black and a binder mixed in a predetermined composition, to form a powder layer, directly on the planar metal substrate, which is attracted to the grounded metal layer;

a laser configured to generate a laser beam to selectively sinter portions of the powder layer using a predetermined beam scanning pattern, such that spaced apart linear traces of the powder layer are sintered sequentially by the laser beam as the rollers are controlled to move the flexible, planar metal layer in a sequential operation, to form a finished material layer having an electrically conductive connection between the continuous, flexible, planar metal layer and the sintered portions of the powder layer; and a subsystem for removing portions of the powder layer that are not sintered by the laser to leave a planar finished material layer having structural features with an engineered height, thickness and spacing.

2. The system of claim 1, wherein the flexible, planar metal layer comprises an aluminum layer.

3. The system of claim 1, wherein the electrostatic powder deposition component comprises an electrostatic spray gun for imparting an electrical charge to the powder as the powder is discharged from a nozzle of the electrostatic spray gun.

4. The system of claim 1, wherein the laser comprises a laser having at least one of a plurality of differing wavelengths, the differing wavelengths including at least one of blue, green, near infrared or far infrared wavelengths.

5. The system of claim 1, wherein a laser power of between 1 W and 1 kW is used in operating the laser.

6. The system of claim 1, wherein the laser is operated to provide a volumetric laser energy density ranging between about 0.1 $Wh/cm^3$ to about 2 $Wh/cm^3$.

7. The system of claim 1, wherein the laser beam comprises a beam spot size diameter between 50 μm to 1 cm.

8. The system of claim 1, wherein the laser is operated at a scan speed of 1 mm/second to 3000 mm/second.

9. The system of claim 1, wherein the powder comprises a dry powder mixture.

10. The system of claim 1, wherein the active material comprises at least one of:
    NMC 811;
    NMC 622;
    NMC 532;
    NMC 111;
    N-Carboxyanhydride (NCA);
    Lithium Cobalt Oxide (LCO);
    Lithium Iron Phosphate;
    Graphite;
    Silicon; or
    a metal oxide including one or more of $TiO_2$, $Li_4Ti_5O_{12}$, $Fe_2O_3$ and $SnO_2$.

11. The system of claim 9, wherein the dry powder mixture includes a binder, and wherein the binder includes at least one of:
    Polyvinylidene fluoride (PVDF);
    Carboxymethyl cellulose (CMC);
    Polyacrylic acid (PAA); or
    Polytetrafluoroethylene (PTFE).

* * * * *